United States Patent
Thornton

[19]
[11] Patent Number: 6,148,182
[45] Date of Patent: Nov. 14, 2000

[54] TECHNIQUE TO FACILITATE THE INDEPENDENT BI-DIRECTIONAL DATA TRANSMISSION ON A SINGLE AMPLITUDE MODULATED CARRIER

[75] Inventor: Barry Thornton, Austin, Tex.

[73] Assignee: INT Labs, Inc., Austin, Tex.

[21] Appl. No.: 08/955,532

[22] Filed: Oct. 22, 1997

Related U.S. Application Data

[63] Continuation-in-part of application No. 08/873,619, Jun. 12, 1997.
[60] Provisional application No. 60/029,033, Oct. 28, 1996.
[51] Int. Cl.$^7$ .................................................. H04R 7/20
[52] U.S. Cl. .................... 455/88; 455/86; 455/7
[58] Field of Search ......................... 375/276, 277, 375/281, 295, 326, 259, 316, 329, 332; 455/86, 526, 7, 24, 47, 502, 507, 557, 88, 44, 108, 203, 210, 500, 39; 370/295, 485, 480; 340/825.05, 825.18, 870.31

[56] References Cited

U.S. PATENT DOCUMENTS

| | | |
|---|---|---|
| 3,916,412 | 10/1975 | Amoroso, Jr. . |
| 3,925,729 | 12/1975 | Amoroso . |
| 3,931,575 | 1/1976 | Amoroso, Jr. . |
| 4,044,307 | 8/1977 | Borysiewicz et al. .................. 325/42 |
| 4,107,471 | 8/1978 | Reed . |
| 4,339,816 | 7/1982 | Reed . |
| 4,510,595 | 4/1985 | Glance et al. . |
| 4,644,526 | 2/1987 | Wu . |
| 4,683,565 | 7/1987 | Hanulec . |
| 4,819,263 | 4/1989 | Franklin . |
| 4,916,296 | 4/1990 | Streck et al. ........................... 235/454 |
| 4,941,201 | 7/1990 | Davis .................................. 455/41 |
| 5,052,024 | 9/1991 | Moran, II et al. ...................... 455/73 |
| 5,241,410 | 8/1993 | Streck et al. ........................... 359/176 |
| 5,241,566 | 8/1993 | Jackson . |
| 5,260,701 | 11/1993 | Guern et al. ........................... 455/88 |
| 5,285,443 | 2/1994 | Patsiokas et al. ...................... 455/88 |
| 5,305,469 | 4/1994 | Camiade et al. ....................... 455/78 |
| 5,323,149 | 6/1994 | Hoult et al. ........................... 340/825.54 |
| 5,345,231 | 9/1994 | Koo et al. ............................ 340/870.31 |
| 5,483,551 | 1/1996 | Huang ................................. 375/285 |
| 5,511,232 | 4/1996 | O'Dea et al. .......................... 455/88 |
| 5,524,274 | 6/1996 | Takahashi et al. ..................... 455/88 |
| 5,577,067 | 11/1996 | Zimmerman .......................... 375/224 |
| 5,606,729 | 2/1997 | D'Amico et al. . |
| 5,613,218 | 3/1997 | Li et al. . |
| 5,631,757 | 5/1997 | Bodeep et al. ......................... 455/73 |
| 5,912,895 | 6/1999 | Terry et al. ........................... 375/222 |

*Primary Examiner*—William G. Trost
*Assistant Examiner*—Jean A. Gelin
*Attorney, Agent, or Firm*—Haynes & Boone, LLP

[57] ABSTRACT

Method and apparatus for facilitating the simultaneous bi-directional transmission of data on a single AM carrier is described. In particular, the process is implemented using two or more transceivers, each comprising a modulator, a demodulator, and an oscillator operating at the same frequency and in locked phase. One of the oscillators functions as a master, to which all other oscillators ("slaves") are locked. Each of the transceivers also includes means for recovering the appropriate signal to be demodulated by the particular transceiver.

21 Claims, 2 Drawing Sheets

TECHNIQUE TO FACILITATE THE INDEPENDENT BI-DIRECTIONAL DATA TRANSMISSION ON A SINGLE AMPLITUDE MODULATED CARRIER

CROSS-REFERENCE TO RELATED APPLICATIONS

This application is a continuation-in-part of commonly assigned U.S. patent application Ser. No. 08/873,619 filed on Jun. 12, 1997, and claims the benefit of U.S. Provisional Patent Application Ser. No. 60/029,033, filed on Oct. 28, 1996, both hereby incorporated by reference in their entireties.

This application is related to copending U.S. patent application Ser. No. 08/955,482, U.S. patent application Ser. No. 08/955,533, U.S. patent application Ser. No. 08/956,244, U.S. patent application Ser. No. 08/955,480 (now U.S. Pat. No. 5,994,952 issued Nov. 30, 1999), all filed on even date herewith, assigned to the assignee of the present invention, and hereby incorporated by reference in their entireties.

TECHNICAL FIELD

The invention relates generally to radio frequency communications and, more particularly, to method and apparatus for enabling the simultaneous bi-directional transmission of information on a single AM carrier via a wired or wireless transmission medium.

BACKGROUND OF THE INVENTION

Transmission of data using a transmission system is typically conceptualized as a one-way transfer of data or information from a transmitting end, or transmitter, to a receiving end, or receiver. In radio frequency ("RF") transmission systems that utilize amplitude modulation ("AM") techniques to transmit data or information, an audio signal containing the data is used to modulate the amplitude of an RF carrier signal, wherein the data is contained in the side-band(s) of the signal created by the modulation technique. As is well known in the art, the side-band(s) comprises one or both the sum and difference of the carrier and data energy. A transmission system such as that described above is illustrated in FIG. 1.

As illustrated in FIG. 2, two-way, or bi-directional, simultaneous transmission is typically accomplished through the use of two carriers at different frequencies. Current technology enables either direction of transmission on a single carrier frequency, but not both directions at the same time.

Because individual carriers must be used for the transmission of amplitude modulated data, two carriers and their associated side-bands must be employed for the simultaneous transmission of two channels of data. The primary disadvantage associated with this technique is that it requires two transmissions, each occupying a specific amount of bandwidth based on the bandwidth of the data being processed to accomplish simultaneous bi-directional data transmission.

Therefore, what is needed is a technique for facilitating the simultaneous bi-directional transmission data using a single carrier.

SUMMARY OF THE INVENTION

In a preferred embodiment, the invention comprises method and apparatus for facilitating the simultaneous bi-directional transmission of information on a single AM carrier. In particular, the process is implemented using two or more transceivers, each comprising a modulator, a demodulator, and an oscillator operating at the same frequency and in locked phase. One of the oscillators functions as a master, to which all other oscillators ("slaves") are locked. Each of the transceivers also includes means for recovering the appropriate signal to be demodulated by the particular transceiver.

A technical advantage achieved with the invention is that it significantly decreases the bandwidth needed to transmit two simplex or full duplex signals.

Another technical advantage achieved with the invention is that it improves the performance of signal transmission through the use of truly synchronous detection of the data and lower noise due to the common modality of noise and signal aberrations in both the carrier and data, resulting in their mutual cancellation.

Another technical advantage achieved with the invention is the operation of the modulation process down to DC signals.

Yet another technical advantage achieved with the invention is the use of one master clock for the entire transmission system.

Still another technical advantage achieved with the invention is the use of one or more high transient response narrow-band filters for carrier recovery.

DETAILED DESCRIPTION OF THE PREFERRED EMBODIMENT

Figure 1:
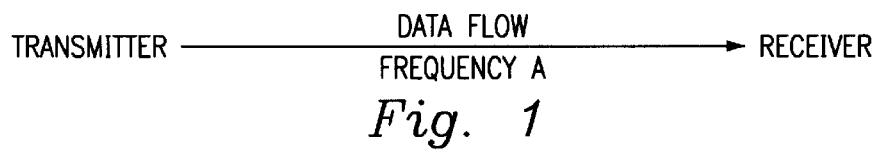
FIG. 1 illustrates a unidirectional transmission process using a single carrier.
Figure 2:
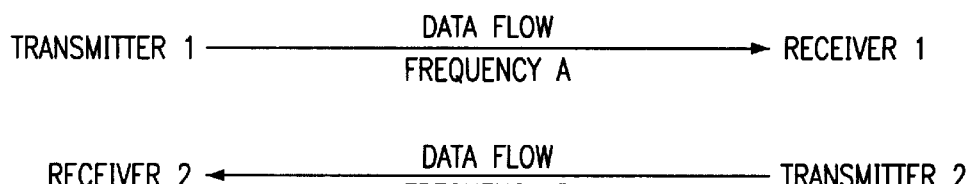
FIG. 2 illustrates a bi-directional transmission process using two carriers.

FIGS. 1 and 2 respectively illustrate techniques for enabling uni- and bi-directional transmission of data via one and two carriers, respectively.

Figure 3:
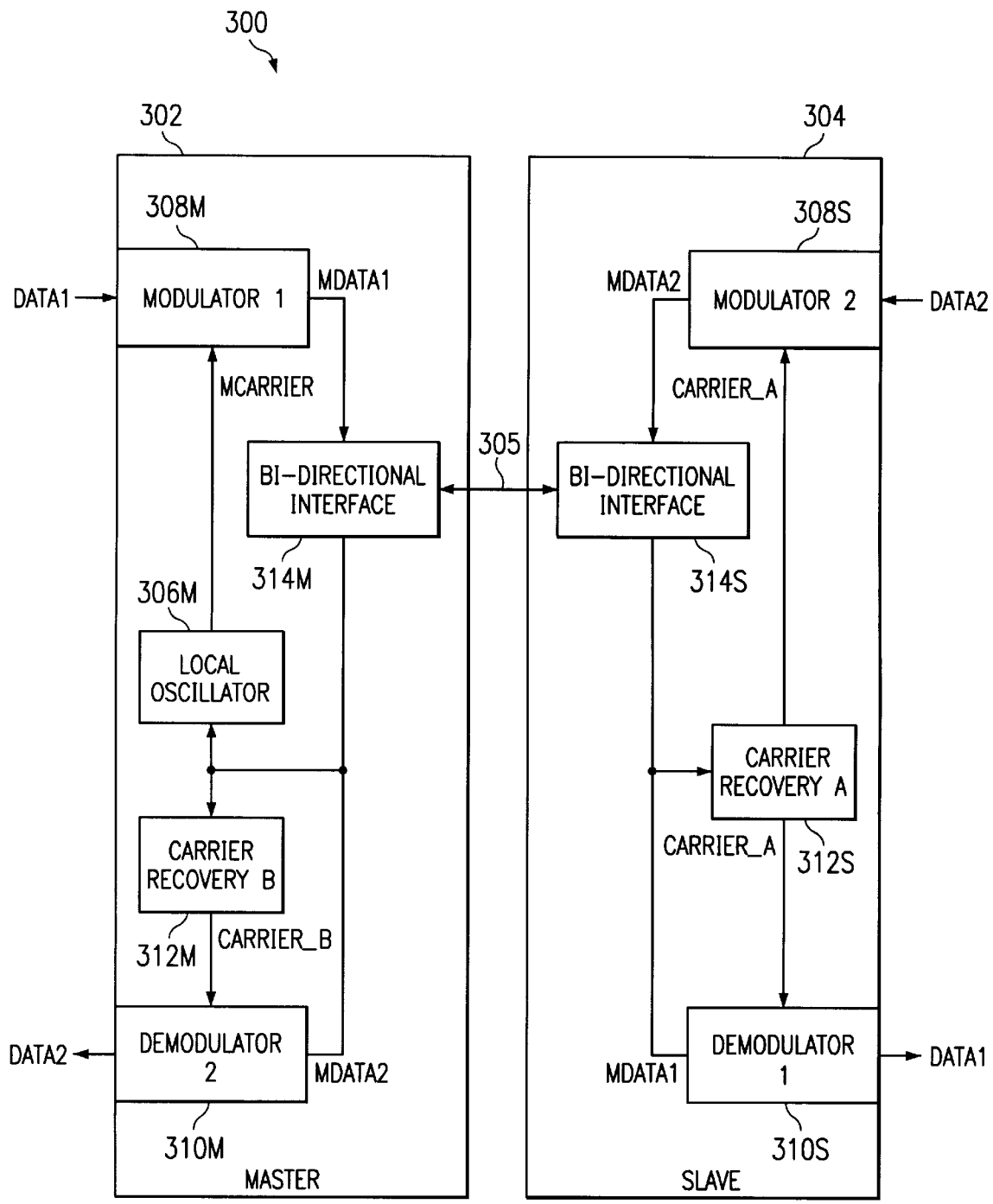
FIG. 3 is a system block diagram of an RF transceiver system embodying features of the present invention.

FIG. 3 is a system block diagram an RF transceiver system 300 embodying features of the present invention. As shown in FIG. 3, the system 300 comprises a "master" transceiver 302, and one or more "slave" transceivers, represented in FIG. 3 by a slave transceiver 304, interconnected via a transmission medium 305. It should be noted that, although represented in FIG. 3 as a cable, the transmission medium may comprise any available type of medium, including both wired and wireless media.

The master transceiver 302 comprises a local oscillator 306M, a modulator 308M, a demodulator 310M, and a carrier recovery device 312M Similarly, the slave transceiver 304 comprises a modulator 308S, a demodulator 310S, and a carrier recovery device 312S. Each of the transceivers 302, 304, also optionally includes a bi-directional coupler 314M, 314S, respectively, for purposes that will be described in detail below.

In operation, an original master carrier ("MCARRIER") generated by the local oscillator 306M is input to the modulator 308M, which modulates MCARRIER using a first input data stream, designated DATA1, resulting in a modulated data signal MDATA1, comprising a carrier and one or more side-bands, being output from the modulator 308M onto the transmission medium 305.

At the slave transceiver 304, MCARRIER is extracted from the signal received via the transmission medium 305 by the carrier recovery device 312S, which, in the preferred embodiment, is a fast response, low transient characteristic narrow-band filter, such as that described in the above-referenced U.S. patent application Ser. No. 08/955,480 (now U.S. Pat. No. 5,994,952 issued Nov. 30, 1999). The recovered carrier, hereinafter referred to as CARRIER_A, as well as the signal received via the transmission medium 305 (i.e., MDATA1), are provided to the demodulator 310S for effecting the synchronous demodulation and recovery of DATA1 from the demodulator 310S, as will be described in greater detail below. It should be noted that, at this point, it is likely that the phases of MCARRIER and CARRIER_A will be different, but the difference will remain fixed over time. MCARRIER and CARRIER_A are otherwise of the same frequency.

Due to the characteristics of the carrier recovery device 312S, CARRIER_A contains all of the same instantaneous phase and amplitude errors as the modulated side-band(s), due to mutually induced errors from both the cable 316 and the transmission process. Accordingly, a characteristic of the balanced demodulation process known as common-mode rejection reduces the effects of the errors on the modulated data, thus improving throughput, bandwidth, and error rate of the system 300. In addition, this exacting relationship between the carrier and the modulated data permits operation down to DC for DSB, SSB, AM and QAM.

CARRIER_A is also input to the modulator 308S, which modulates CARRIER_A using a second input data stream, designated DATA2, resulting in a modulated data signal MDATA2, comprising a carrier and one or more side-bands, being output from the modulator 308S onto the transmission medium 305. It will be recognized that the side-band(s) of MDATA2 exists at the same frequencies as the side-band(s) of MDATA1.

Figure 4:
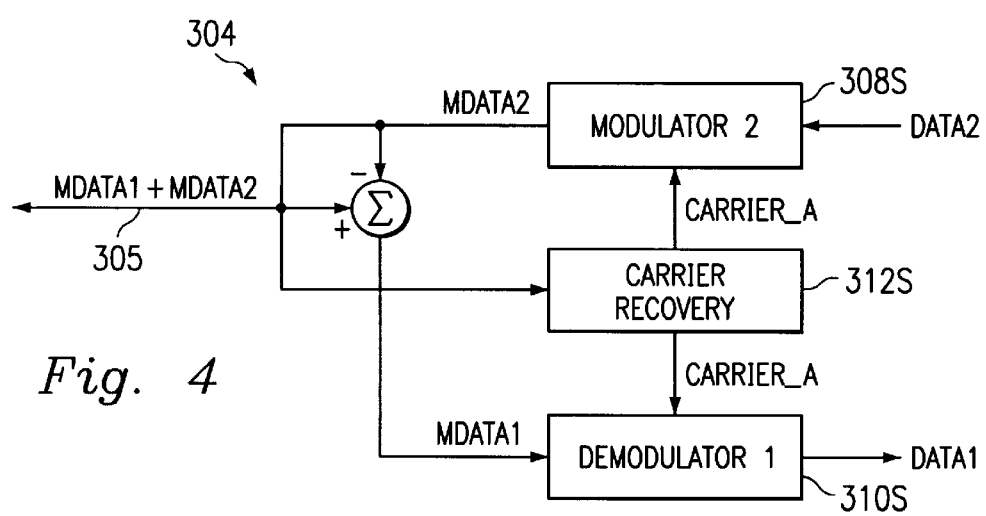
FIG. 4 illustrates an alternative technique for separating data signals simultaneously transmitted on a single AM carrier.
Figure 5:
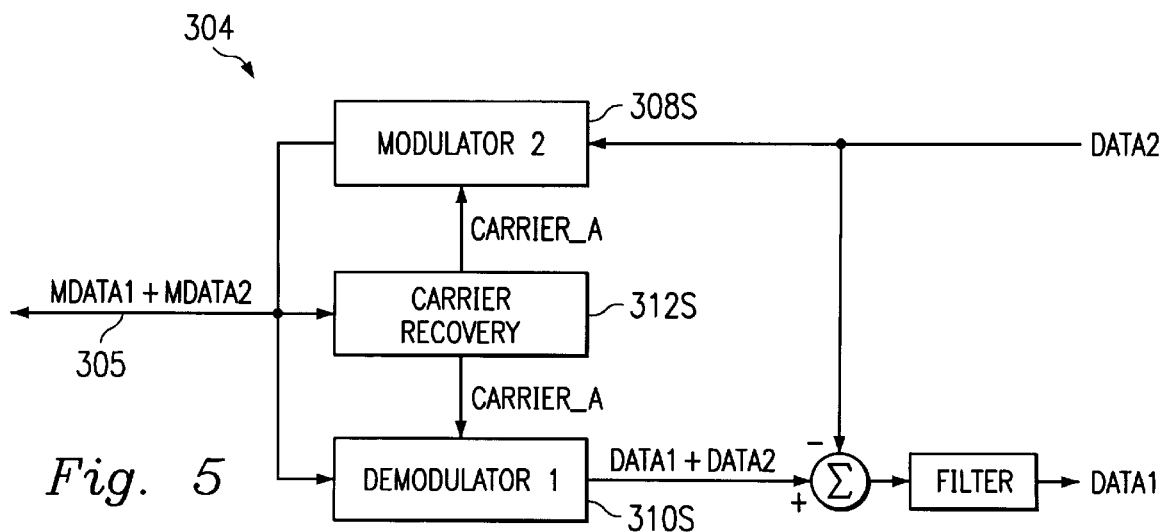
FIG. 5 illustrates another alternative technique for separating data signals simultaneously transmitted on a single AM carrier.

At this point, MDATA1 and MDATA2 both exist on the transmission medium 305 and therefore, unless corrective measures are taken, MDATA1+MDATA2 will be presented to both demodulators 310M and 310S, such that the signal output each of the transceivers 302, 304, will be DATA1+ DATA2. There are at least three options for enabling the recovery of DATA1 and DATA2 separately by the slave transceiver 304 and master transceiver 302, respectively. The first, which is illustrated in FIG. 3, is to use bi-directional couplers 314M, 314S, to sort out MDATA1 from MDATA2 and send each along its respective path. The second, which is illustrated in FIG. 4 with reference to the slave transceiver 304, is to subtract MDATA2 from the MDATA1+MDATA2 signal, resulting in the recovery of DATA1 alone. Finally, as illustrated in FIG. 5, again with reference to the slave transceiver 304, DATA2 as it is input could be subtracted the output of the demodulator 310S and the remainder of MCARRIER could be filtered off.

This same event occurs back at the master transceiver 302. The carrier recovered by the carrier recovery device 312M (CARRIER_B) is used to drive the demodulator 310M to recover DATA2. As indicated above, it is likely that the phases of CARRIER_A and CARRIER_B will be different, but the difference will remain fixed over time. CARRIER_A and CARRIER_B are otherwise of the same frequency. The issue of separation of combined signals is handled as described above with reference to the slave transceiver 304.

Alternatively, it will be recognized that the carrier recovery device 312M could be eliminated and MCARRIER provided directly to the demodulator 310M by the local oscillator 306M. The disadvantages to this embodiment are that MCARRIER, unlike CARRIER_B, will not contain any noise or error information induced in the signal during transmission from the slave transceiver 304 to the master transceiver 302 and therefore such noise and error information will not cancel out. Accordingly, the preferred embodiment is to include in the master transceiver 302 the carrier recovery device 312M.

It is important to note that the receive portions of both transceivers 302, 304, can operate as true synchronous detectors. As the side-band(s) and the recovered carrier possess the same phase and amplitude anomalies acquired in the transmission transfer process, the induced signal aberrations are reduced or eliminated in the detection process through their common modality when demodulated with a balanced modulator-type detector. Advantages of this are the reduction of the effects of outside noise or other transmission errors, as well as the ability to demodulate single and double side-band, quadrature amplitude modulation, and variants of those, including FSK with higher fidelity, i.e., wider bandwidth, lower noise, lower distortion, and extended low frequency response, than conventional techniques.

In addition to these aspects of the process, the stable relationship between the two carriers and their respective side-bands makes it easy to use the two (upper and lower) side-bands to carry independent data while retaining the simultaneous bi-directional characteristics. In this variation, the data density of the single carrier is again doubled, providing dual-channel bi-directional data flow on a single carrier.

Although an illustrative embodiment of the invention has been shown and described, other modifications, changes, and substitutions are intended in the foregoing disclosure. Accordingly, it is appropriate that the appended claims be construed broadly and in a manner consistent with the scope of the invention.

What is claimed is:

1. A transmission system for enabling simultaneous bi-directional transmission of radio frequency ("RF") signals using a single carrier frequency the transmission system comprising:

a master transceiver comprising:

a local oscillator for generating a master carrier at said carrier frequency; and a modulator connected to receive said master carrier from said local oscillator, said master transceiver modulator modulating said master carrier using a first data signal input to said master transceiver to create a first modulated data signal and outputting said first modulated data signal to a transmission medium; and at least one slave transceiver connected to said master transceiver via said transmission medium and comprising:

a carrier recovery device electrically connected to said transmission medium for recovering said carrier from said first modulated data signal on a cycle-by-cycle basis;

a modulator connected to receive said first recovered carrier from said slave transceiver carrier recovery device, said slave transceiver modulator modulating said recovered carrier using a second data signal input to said slave transceiver to create a second modulated data signal and outputting said second modulated data signal to said transmission medium; and a demodulator connected to receive said first recovered carrier from said slave transceiver carrier recovery device, said slave transceiver demodulator using said first recovered carrier to demodulate signals input thereto from said transmission medium;

wherein said master transceiver further comprises:
  a carrier recovery device electrically connected to said transmission medium for recovering said carrier from said second modulated data signal on a cycle-by-cycle basis; and
  a demodulator connected to receive said second recovered carrier from said master transceiver carrier recovery device, said master transceiver demodulator using said second recovered carrier to demodulate signals input thereto from said transmission medium;
  wherein said master transceiver comprises first means for separating said first and second modulated data signals such that only said second data signal is output from said master transceiver and wherein said slave transceiver comprises second means for separating said first and second modulated data signals such that only said first data signal is output from said slave transceiver.

2. The transmission system of claim 1 wherein each of said first and second means for separating comprises a bi-directional coupler connected to said transmission medium.

3. The transmission system of claim 1 wherein:
  said first means for separating comprises a summer having a first input connected to receive signals from said transmission medium, a second input connected to an output of said master transceiver modulator, and an output connected to an input of said master transceiver demodulator for subtracting said first modulated data signal from a sum of said first and second modulated data signals on said transmission medium such that only said second modulated data signal is input to said master transceiver demodulator; and
  said second means for separating comprises a summer having a first input connected to receive signals from said transmission medium, a second input connected to an output of said slave transceiver modulator, and an output connected to an input of said slave transceiver demodulator for subtracting said second modulated data signal from a sum of said first and second modulated data signals on said transmission medium such that only said first modulated data signal is input to said slave transceiver demodulator.

4. The transmission system of claim 1 wherein:
  said first means for separating comprises a summer having a first input connected to an output of said master transceiver demodulator and a second input connected to receive said first data signal for subtracting said first input data signal from a sum of said first and second data signals subsequent to demodulation of said first and second modulated data signals such that only said second data signal is output from said master transceiver; and
  said second means for separating comprises a summer having a first input connected to an output of said slave transceiver demodulator and a second input connected to receive said second data signal for subtracting said second input data signal from a sum of said first and second data signals subsequent to demodulation of said first and second modulated data signals such that only said first data signal is output from said slave transceiver.

5. The transmission system of claim 1 wherein each of said first and second modulated data signals are modulated using a modulation technique selected from the group consisting of amplitude modulation, quadrature amplitude modulation, single side-band modulation, and double side-band modulation.

6. The transmission system of claim 1 wherein said transmission medium is selected from the group consisting of wire, fiber optic cable, and air.

7. The transmission system of claim 1 wherein each of said master transceiver and slave transceiver carrier recovery devices is an electronic wave interferometric filter.

8. A transmission system for enabling simultaneous bi-directional transmission of radio frequency ("RF") signals using a single carrier frequency, the transmission system comprising:
  a master transceiver comprising:
    means for generating a master carrier at said carrier frequency; and
    modulating means connected to receive said master carrier from said master transceiver generating means, said master transceiver modulating means for modulating said master carrier using a first data signal input to said master transceiver to create a first modulated data signal and outputting said first modulated data signal to a transmission medium; and
  at least one slave transceiver connected to said master transceiver via said transmission medium and comprising:
    carrier recovery means electrically connected to said transmission medium for recovering said carrier from said first modulated data signal on a cycle-by-cycle basis;
    modulating means connected to receive said first recovered carrier from said slave transceiver carrier recovery means, said slave transceiver modulating means for modulating said recovered carrier using a second data signal input to said slave transceiver to create a second modulated data signal and outputting said second modulated data signal to said transmission medium; and
    demodulating means connected to receive said first recovered carrier from said slave transceiver carrier recovery means, said slave transceiver demodulating means using said first recovered carrier to demodulate signals input thereto from said transmission medium;
  wherein said master transceiver further comprises:
    carrier recovery means electrically connected to said transmission medium for recovering said carrier from said second modulated data signal on a cycle-by-cycle basis;
    demodulating means connected to receive said second recovered carrier from said master transceiver carrier recovery means, said master transceiver demodulating means using said second recovered carrier to demodulate signals input thereto from said transmission medium; and
    means for separating said first and second modulated data signals such that only said second data signal is output from said master transceiver; and
  wherein said slave transceiver further comprises:
    means for separating said first and second modulated data signals such that only said first data signal is output from said slave transceiver.

9. The transmission system of claim 8 wherein each of said separating means comprises a bidirectional coupler connected to said transmission medium.

10. The transmission system of claim 8 wherein:
  said master transceiver separating means comprises summing means having a first input connected to receive signals from said transmission medium, a second input connected to an output of said master transceiver modulating means, and an output connected to an input of said master transceiver demodulating means, said master transceiver summing means for subtracting said first modulated data signal from a sum of said first and second modulated data signals on said transmission medium such that only said second modulated data signal is input to said master transceiver demodulating means; and said slave transceiver separating means comprises summing means having a first input connected to receive signals from said transmission medium, a second input connected to an output of said slave transceiver modulating means, and an output connected to an input of said slave transceiver demodulating means, said slave transceiver summing means for subtracting said second modulated data signal from a sum of said first and second modulated data signals on said transmission medium such that only said first modulated data signal is input to said slave transceiver demodulating means.

11. The transmission system of claim 8 wherein:

said master transceiver separating means comprises summing means having a first input connected to an output of said master transceiver demodulating means and a second input connected to receive said first data signal, said master transceiver summing means for subtracting said first input data signal from a sum of said first and second data signals subsequent to demodulation of said first and second modulated data signals such that only said second data signal is output from said master transceiver; and said slave transceiver separating means comprises summing means having a first input connected to an output of said slave transceiver demodulating means and a second input connected to receive said second data signal, said slave transceiver summing means for subtracting said second input data signal from a sum of said first and second data signals subsequent to demodulation of said first and second modulated data signals such that only said first data signal is output from said slave transceiver.

12. The transmission system of claim 8 wherein each of said first and second modulated data signals are modulated using a modulation technique selected from the group consisting of amplitude modulation, quadrature amplitude modulation, single side-band modulation, and double side-band modulation.

13. The transmission system of claim 8 wherein said transmission medium is selected from the group consisting of wire, fiber optic cable, and air.

14. The transmission system of claim 8 wherein each of said master transceiver and slave transceiver carrier recovery means is an electronic wave interferometric filter.

15. A method of enabling simultaneous bi-directional transmission of radio frequency ("RF") signals on a single carrier frequency via a transmission medium, the transmission system comprising a master transceiver connected to at least one slave transceiver via the transmission medium, the method comprising steps of:

(a) generating a master carrier at said carrier frequency;

(b) modulating said master carrier using a first data signal input to said master transceiver to create a first modulated data signal;

(c) outputting said first modulated data signal from said master transceiver onto said transmission medium;

(d) recovering said carrier from said transmitted first modulated data signal on a cycle-by-cycle basis;

(e) modulating said recovered carrier using a second data signal input to said slave transceiver to create a second modulated data signal;

(f) outputting said second modulated data signal from said slave transceiver onto said transmission medium;

(g) using said first recovered carrier to demodulate signals input to said slave transceiver from said transmission medium;

(h) recovering said carrier from said second modulated data signal on a cycle-by-cycle basis; and (i) using said second recovered carrier to demodulate signals input to said master transceiver from said transmission medium;

wherein steps a, b, c, h, and i are performed at said master transceiver and steps d, e, f, and g are performed at said slave transceiver;

the method further comprising the steps of, at each of said master transceiver and said slave transceiver, separating said first and second modulated data signals such that only said second data signal is output from said master transceiver and only said first data signal is output from said slave transceiver.

16. The method of claim 15 wherein said separating comprises:

at said master transceiver, prior to execution of step i, subtracting said first modulated data signal from a sum of said first and second modulated data signals on said transmission medium; and at said slave transceiver, prior to execution of step g, subtracting said second modulated data signal from a sum of said first and second modulated data signals on said transmission medium.

17. The method of claim 15 further comprising:

at said master transceiver, subsequent to execution of step i, subtracting said first input data signal from a sum of said first and second data signals; and at said slave transceiver, subsequent to execution of step g, subtracting said second input data signal from a sum of said first and second data signals.

18. The method of claim 17 further comprising:

at said master transceiver, subsequent to said subtracting, filtering said second data input signal; and at said slave transceiver, subsequent to said subtracting, filtering said first data input signal.

19. The method of claim 15 wherein steps b and e are performed using a modulation technique selected from the group consisting of amplitude modulation, quadrature amplitude modulation, single side-band modulation, and double side-band modulation.

20. The method of claim 15 wherein said transmission medium is selected from the group consisting of wire, fiber optic cable, and air.

21. The method of claim 15 wherein steps d and h are performed using an electronic wave interferometric filter.

* * * * *